United States Patent
Kigami (10) Patent No.: US 10,618,354 B2
(45) Date of Patent: Apr. 14, 2020

(54) TIRE

(71) Applicant: Sumitomo Rubber Industries, Ltd., Kobe-shi, Hyogo (JP)

(72) Inventor: Yuki Kigami, Kobe (JP)

(73) Assignee: SUMITOMO RUBBER INDUSTRIES, LTD., Kobe-Shi, Hyogo (JP)

(*) Notice: Subject to any disclaimer, the term of this patent is extended or adjusted under 35 U.S.C. 154(b) by 256 days.

(21) Appl. No.: 15/614,065

(22) Filed: Jun. 5, 2017

(65) Prior Publication Data
US 2017/0368883 A1 Dec. 28, 2017

(30) Foreign Application Priority Data

Jun. 27, 2016 (JP) .................................. 2016-127094

(51) Int. Cl.
| | | |
|---|---|---|
| *B60C 11/03* | (2006.01) | |
| *B60C 11/11* | (2006.01) | |
| *B60C 11/12* | (2006.01) | |

(52) U.S. Cl.
CPC ...... *B60C 11/0302* (2013.01); *B60C 11/0304* (2013.01); *B60C 11/0306* (2013.01); *B60C 11/11* (2013.01); *B60C 11/1204* (2013.01); *B60C 11/1236* (2013.01);
(Continued)

(58) Field of Classification Search
CPC ... B60C 11/0304; B60C 11/0306; B60C 11/11
See application file for complete search history.

(56) References Cited

U.S. PATENT DOCUMENTS

| | | | |
|---|---|---|---|
| 2011/0303333 A1* | 12/2011 | Muto | B60C 11/0306 152/209.25 |
| 2014/0137999 A1* | 5/2014 | Nishiwaki | B60C 11/0309 152/209.8 |
| 2016/0368326 A1 | 12/2016 | Wakizono | |

FOREIGN PATENT DOCUMENTS

| | | | | |
|---|---|---|---|---|
| EP | 1070606 A2 | 1/2001 | | |
| EP | 1375198 A1 * | 1/2004 | ............. | B60C 11/11 |
| EP | 3081393 A1 | 10/2016 | | |

(Continued)

OTHER PUBLICATIONS

Extended European Search Report, dated Nov. 10, 2017, for European Application No. 17170273.1.

*Primary Examiner* — Jacob T Minskey
*Assistant Examiner* — Melody Tsui
(74) *Attorney, Agent, or Firm* — Birch, Stewart, Kolasch & Birch, LLP (57) ABSTRACT

A tire comprises a tread portion 2 having an outboard tread edge To and an inboard tread edge Ti and provided with an outboard shoulder main groove 3 and an outboard crown main groove 4 extending continuously in the tire circumferential direction so as to define an outboard middle land region 10 therebetween. The outboard middle land region 10 comprises outboard middle blocks 17 circumferentially divided by outboard middle lateral grooves 16. Each of the outboard middle blocks 17 is provided with outboard middle sipes 20 extending zigzag in the tire axial direction, wherein each of the outboard middle sipes 20 has an axially outer end terminated within the outboard middle block 17, and the above-said a plurality of outboard middle sipes 20 include at least one outboard middle sipe whose axially inner end is connected with the outboard crown main groove 4.

19 Claims, 8 Drawing Sheets

(52) U.S. Cl.
CPC ........... *B60C 2011/0348* (2013.01); *B60C 2011/0358* (2013.01); *B60C 2011/129* (2013.01); *B60C 2011/1213* (2013.01)

(56) References Cited

FOREIGN PATENT DOCUMENTS

| | | |
|---|---|---|
| JP | 11-310013 A | 11/1999 |
| JP | 2015-123936 A | 7/2015 |
| WO | WO 2015/098408 A1 | 7/2015 |

\* cited by examiner

TIRE

TECHNICAL FIELD

The present invention relates to a tire, more particularly to an asymmetrical tread pattern capable of improving on-ice performance and steering stability.

BACKGROUND ART

Japanese Patent Application Publication No. 2015-123936 discloses a pneumatic tire comprising a tread portion provided in each block with sipes extending zigzag in the tire axial direction, and the tread pattern is an asymmetrical block-type tread pattern by which the tire mounting location on the vehicle is specified.

In such asymmetrical block-type tread pattern, when the sipes provided in outboard middle blocks located in a middle region of an outboard half tread area are extended to the axially outer edges of the blocks, the rigidity of each block is decreased in its axially outer part, and the steering stability on dry roads is liable to deteriorate.

Figure 8A:
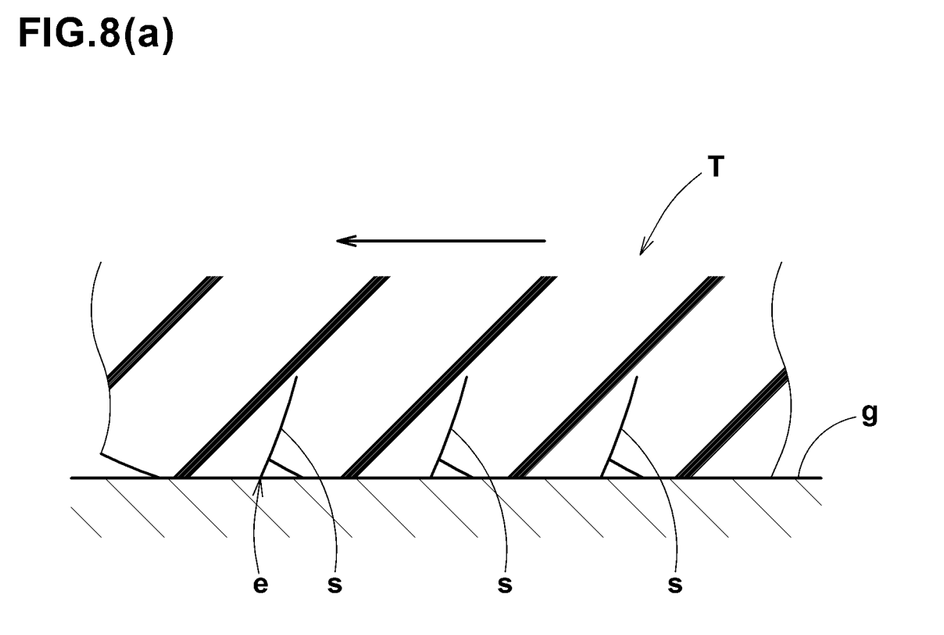
FIG. 8(a) and FIG. 8(b) are schematic cross sectional views for explaining an edge effect of a sipe when contacting with the ground.

On the other hand, when a tread block (T) with sipes (s) contacts with the ground (g) as shown in FIG. 8(a), the tread block (T) is deformed, and the edges (e) of the sipes (s) can scratch the road surface.

Figure 8B:
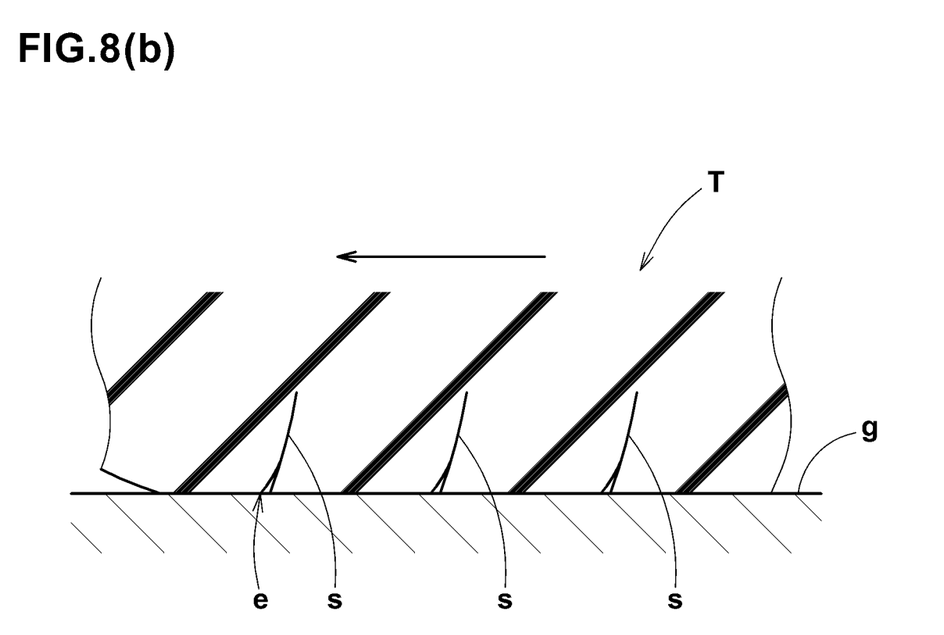

If the outboard middle blocks are provided with only closed sipes (a type of sipe whose both ends are closed in the block), as the deformation of the block during running on icy roads is decreased as shown in FIG. 8(b), and it is difficult for the sipe edges (e) to effectively scratch the road surface, and the on-ice performance is liable to deteriorate.

SUMMARY OF THE INVENTION

It is therefore, an object of the present invention to provide a tire improved in the on-ice performance and steering stability.

According to the present invention, a tire comprises:

a tread portion having an outboard tread edge to be positioned away from a center of a vehicle body and an inboard tread edge to be positioned close to the center of the vehicle body, the tread portion provided with an outboard shoulder main groove extending continuously in the tire circumferential direction, and an outboard crown main groove extending continuously in the tire circumferential direction and disposed between the outboard shoulder main groove and a tire equator so as to define an outboard middle land region therebetween, the outboard middle land region comprising a plurality of outboard middle blocks circumferentially divided by a plurality of outboard middle lateral grooves extending in the tire axial direction, and each of the outboard middle blocks provided with a plurality of outboard middle sipes extending zigzag in the tire axial direction, wherein the above-said a plurality of outboard middle sipes each have an axially outer end terminated within the outboard middle block, and the above-said a plurality of outboard middle sipes include at least one outboard middle sipe whose axially inner end is connected with the outboard crown main groove.

Further, the tire according to the present invention may includes the following features (1)-(7):

(1) the above-said a plurality of outboard middle sipes include a first outboard middle sipe connected with the outboard crown main groove, and a second outboard middle sipe whose inner end is terminated within the outboard middle block;

(2) each of the outboard middle blocks comprises a part in which the first outboard middle sipe or sipes and the second outboard middle sipe or sipes are disposed alternately in the tire circumferential direction;

(3) shortest distances between the adjacent outboard middle sipes are in a range from 2.0 to 3.0 mm;

(4) the shortest distance from the above-said axially outer end of the outboard middle sipe to the adjacent groove edge of the outboard shoulder main groove is in a range from 1.0 to 3.0 mm;

(5) the tread portion is provided with an outboard shoulder narrow groove extending continuously in the tire circumferential direction and disposed between the outboard shoulder main groove and the outboard tread edge so as to define a first outboard shoulder land region between the outboard shoulder narrow groove and the outboard shoulder main groove, and a second outboard shoulder land region between the outboard shoulder narrow groove and the outboard tread edge;

(6) the first outboard shoulder land region comprises a plurality of first outboard shoulder blocks circumferentially divided by a plurality of first outboard shoulder lateral grooves extending in the tire axial direction, each of the first outboard shoulder blocks is provided with a plurality of first outboard shoulder sipes extending zigzag in the tire axial direction, and each of the first outboard shoulder sipes has an axially outer end terminated within the first outboard shoulder block;

(7) the second outboard shoulder land region comprises a plurality of second outboard shoulder blocks circumferentially divided by a plurality of second outboard shoulder lateral grooves extending in the tire axial direction, each of the second outboard shoulder blocks is provided with a plurality of second outboard shoulder sipes extending zigzag in the tire axial direction, and each of the second outboard shoulder sipes has an axially outer end terminated within the second outboard shoulder block.

DESCRIPTION OF THE PREFERRED EMBODIMENTS

The present invention can be applied to pneumatic tires as well as non-pneumatic (airless) tires for motor vehicles, e.g. passenger cars, heavy duty vehicles and the like.

Taking a pneumatic tire for passenger cars as an example, embodiments of the present invention will now be described in detail in conjunction with the accompanying drawings.

Figure 1:
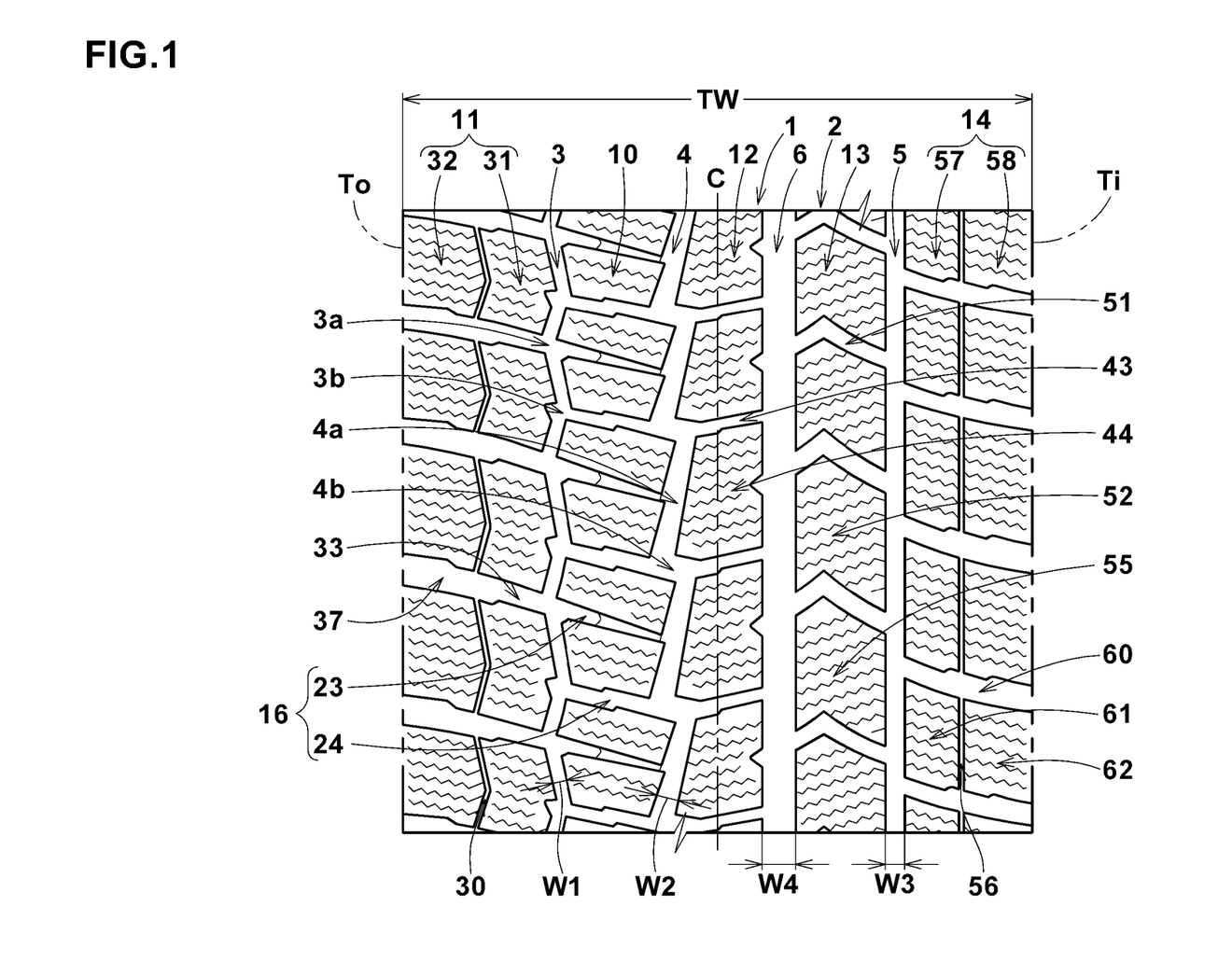
FIG. 1 is a developed partial plan view of a tire as an embodiment of the present invention showing the tread pattern.

FIG. 1 shows a part of the tread portion 2 of a tire 1 as an embodiment of the present invention.

According to the present invention, the tread portion 2 is provided with an asymmetrical tread pattern by which the tire mounting location on the vehicle is specified.

Thus, the tread portion 2 has an outboard tread edge To to be positioned away from the center of the vehicle body, and an inboard tread edge Ti to be positioned close to the center of the vehicle body. For example, a sidewall (not shown) of the tire to be located on outside when installed on the vehicle is provided with an indication representing "outside", and a sidewall to be located on inside is provided with an indication representing "inside".

In the case of a pneumatic tire, the tread edges To and Ti are the axial outermost edges of the ground contacting patch of the tire which occurs under a normally inflated loaded condition when the camber angle of the tire is zero.

The undermentioned tread width TW is the width measured under a normally inflated unloaded condition, as the axial distance between the tread edges determined as above.

The normally inflated unloaded condition is such that the tire is mounted on a standard wheel rim and inflate to a standard pressure but loaded with no ti re load.

The normally inflated loaded condition is such that the tire is mounted on the standard wheel rim and inflated to the standard pressure and loaded with the standard tire load.

The standard wheel rim is a wheel rim officially approved or recommended for the tire by standards organizations, i.e. JATMA (Japan and Asia), T&RA (North America), ETRTO (Europe), TRAA (Australia), STRO (Scandinavia), ALAPA (Latin America), ITTAC (India) and the like which are effective in the area where the tire is manufactured, sold or used.

The standard pressure and the standard tire load are the maximum air pressure and the maximum ti re load for the tire specified by the same organization in the Air-pressure/maximum-load Table or similar list. For example, the standard wheel rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at various cold Inflation Pressures" table in TRA or the like. The standard load is the "maximum load capacity" in JATMA, the "Load Capacity" in ETRTO, the maximum value given in the above-mentioned table in TRA or the like.

In this application including specification and claims, various dimensions, positions and the like of a pneumatic tire refer to those under the normally inflated unloaded condition of the tire unless otherwise noted.

The term "sipe" means a fine groove whose width is not more than 1.5 mm inclusive of a cut having no substantial width.

In this embodiment, the tread portion 2 is provided with four main grooves extending continuously in the tire circumferential direction which are:
an outboard shoulder main groove 3 disposed between the outboard tread edge To and the tire equator C,
an outboard crown main groove 4 disposed between the outboard shoulder main groove 3 and the tire equator C,
an inboard shoulder main groove 5 disposed between the inboard tread edge Ti and the tire equator C, and
an inboard crown main groove 6 disposed between the inboard shoulder main groove 5 and the tire equator C.

The inboard shoulder main groove 5 is a straight groove.
The inboard crown main groove 6 is a straight groove.
The outboard shoulder main groove 3 is a zigzag groove and has axially outwardly projecting first projecting parts 3a and axially inwardly projecting second projecting parts 3b which are alternated in the tire circumferential direction.

The outboard crown main groove 4 is a zigzag groove and made up of long segments 4a and short segments 4b which are alternated in the tire circumferential direction, wherein, with respect to the tire circumferential direction,
the long segments 4a are inclined to one direction, and
the short segments 4b are inclined to one direction opposite to that of the long segments 4a.

Owing to such arrangement of the zigzag outboard main grooves 3 and 4 and the straight inboard main grooves 5 and 6, a frictional force in the tire circumferential direction can be generated by the outboard main grooves 3 and 4 during straight running as well as during cornering on icy roads in which the tire load shifts toward the outboard half tread area. Thus, the grip performance can be effectively improved.

The distance in the tire axial direction from the tire equator C to the outboard shoulder main groove 3 and the distance in the tire axial direction from the tire equator C to the inboard shoulder main groove 5 are preferably set in a range from 0.25 to 0.35 times the tread width TW, for example. The distance in the tire axial direction from the tire equator C to the outboard crown main groove 4 and the distance in the tire axial direction from the tire equator C to the inboard crown main groove 6 are preferably set in a range from 0.05 to 0.10 times the tread width TW, for example.

It is preferable that the groove width W1 of the outboard shoulder main groove 3 is less than the groove width W2 of the outboard crown main groove 4, the groove width W3 of the inboard shoulder main groove 5 and the groove width W4 of the inboard crown main groove 6.

Such design may increase the rigidity of the land region on each side of the outboard shoulder main groove 3 to improve the steering stability during cornering.

From a similar standpoint, it is preferable that the groove width W3 of the inboard shoulder main groove 5 is less than the groove width W2 of the outboard crown main groove 4 and the groove width W4 of the inboard crown main groove 6.

In order to achieve both of the steering stability on dry roads and on-ice performance, it is preferred that the groove width W1 of the outboard shoulder main groove 3, and the groove width W3 of the inboard shoulder main groove 5 are set in a range from 1% to 4% of the tread width TW. And it is preferred that the groove width W2 of the outboard crown main groove 4, and the groove width W4 of the inboard crown main groove 6 are set in a range from 3% to 9% of the tread width TW.

It is preferable that the groove depth of each of the main grooves 3, 4, 5 and 6 is set in a range from 5 to 12 mm in the case of a passenger car tire.

The tread portion 2 is axially divided by the main grooves into an outboard middle land region 10, an outboard shoulder land region 11, a crown land region 12, an inboard middle land region 13, and an inboard shoulder land region 14.

Figure 2:
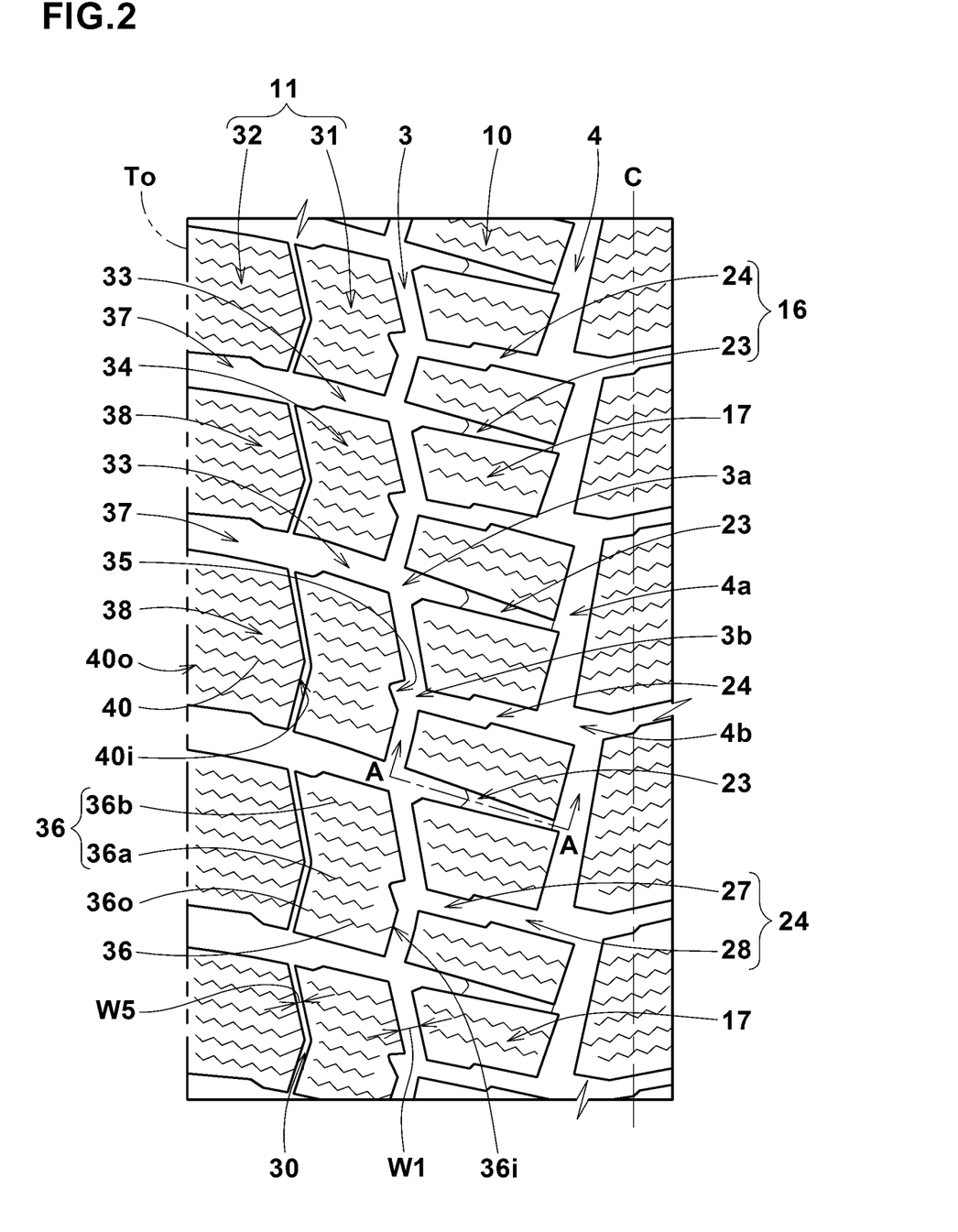
FIG. 2 is a developed partial plan view of the tire showing the outboard middle land region and the outboard shoulder land region.

As shown in FIG. 2, the outboard middle land region 10 between the outboard shoulder main groove 3 and the outboard crown main groove 4 is provided with a plurality of outboard middle lateral grooves 16 extending axially of the tire from the outboard crown main groove 4 to the outboard shoulder main groove 3 and is divided into outboard middle blocks 17.

Figure 3:
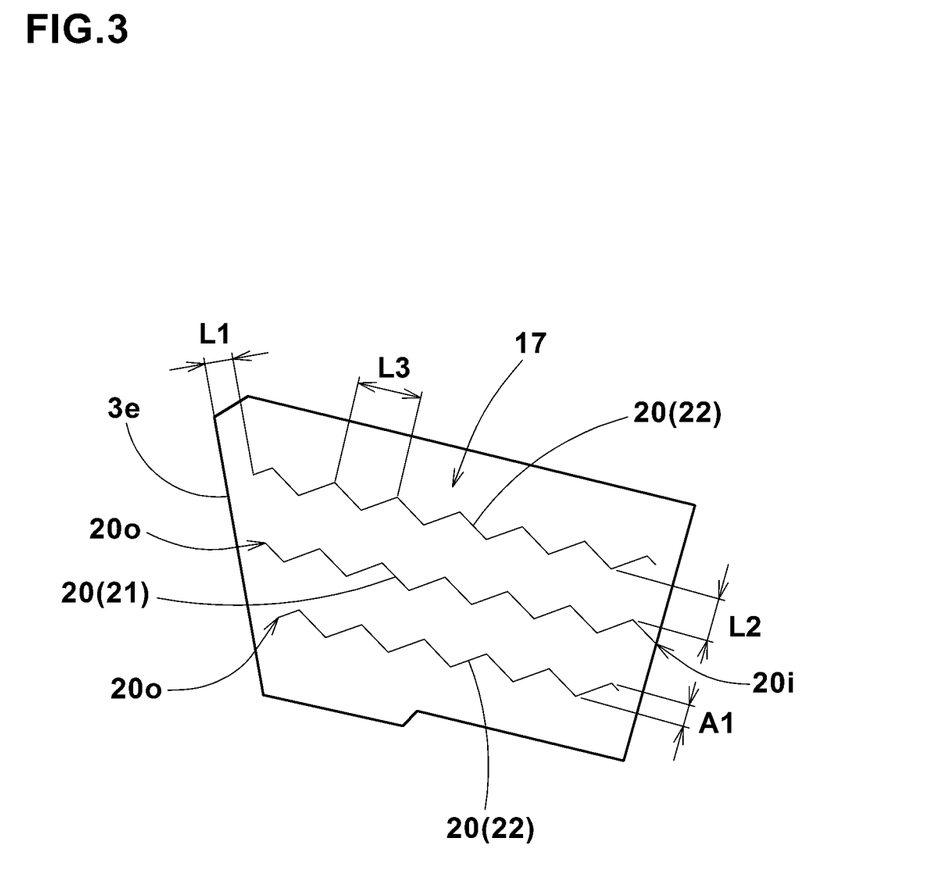
FIG. 3 is an enlarged top view of one of the outboard middle blocks shown in FIG. 2.

As shown in FIG. 3, the outboard middle blocks 17 in this embodiment have an axially long top shape where the axial dimension is more than the circumferential dimension. However, the outboard middle blocks 17 are not limited to such shape.

The outboard middle blocks 17 are each provided with a plurality of outboard middle sipes 20 extending zigzag in the tire axial direction in order that, during running on icy roads, their edges scratch the road surface and provide high traction. When the block 17 comes into contact with the ground, the outboard middle sipes 20 are closed, and the apparent rigidity of the block is increased. Thus, the steering stability on dry roads can be improved.

The outboard middle sipes 20 of each of the outboard middle blocks 17 include at least one outboard middle sipe 20 whose axially inner end 20$i$ is opened to the outboard crown main groove 4 as shown in FIG. 2. Thereby, when the outboard middle block 17 contacts with the ground, the block can be appropriately deformed, and the edges of the sipes can effectively contact with the ground. Thus, the above described scratching effect can be effectively derived to improve the on-ice performance.

In this embodiment, the outboard middle sipes 20 of each of the outboard middle blocks 17 include
a first outboard middle sipe 21 whose axially inner end 20$i$ is opened to the outboard crown main groove 4, and
a second outboard middle sipe 22 whose axially inner end 20$i$ is terminated within the outboard middle block 17.
Further, the outboard middle block 17 in this embodiment has a part where the first outboard middle sipe 21 and the second outboard middle sipe 22 are alternated in the tire circumferential direction.

It is preferable that the first outboard middle sipe 21 is disposed in a central portion of the block 17, and the second outboard middle sipe 22 is disposed in an edge portion of the block 17.

The axially outer end 20$o$ of each of the outboard middle sipes 20 is terminated within the outboard middle block 17 in order to maintain the rigidity of the outboard middle block 17 in its axially outer part not to deteriorate the steering stability on dry roads.

Although, the inner end of the first outboard middle sipe 21 is connected with the outboard crown main groove 4, such arrangement hardly affects the steering stability on dry roads because a lateral force which an outboard crown main groove 4 side of the block 17 receives during cornering is small in comparison with an outboard shoulder main groove 3 side.

In order to secure a sufficient length of the sipe while maintaining the block durability, the shortest distance L1 from the axially outer end 20$o$ of the outboard middle sipe 20 to the groove edge 3$e$ of the outboard shoulder main groove 3 (shown in FIG. 2) is preferably not less than 1.0 mm, more preferably not less than 1.5 mm, but preferably not more than 3.0 mm, more preferably not more than 2.5 mm.

The shortest distance L2 between the adjacent outboard middle sipes 20 is preferably set in a range from 2.0 to 3.0 mm in order to provide a sufficient number of the sipes while securing the rigidity of the block. From a similar standpoint, it is preferable that the wavelength L3 of zigzag wave of the outboard middle sipe 20 is set in a range from 2.0 to 3.0 mm. Further, it is preferable that the peak-to-peak amplitude A1 of the outboard middle sipe 20 is set in a range from 0.70 to 0.80 mm. These ranges of the distance L2, wavelength L3 and peak-to-peak amplitude A1 can be applied to the sipes described hereinafter.

The outboard middle lateral grooves 16 extend obliquely with respect to the tire axial direction as shown in FIG. 2. The outboard middle lateral grooves 16 include first outboard middle lateral grooves 23 and second outboard middle lateral grooves 24.

The first outboard middle lateral grooves 23 extend from the respective long segments 4$a$ of the outboard crown main groove 4 to the respective first projecting parts 3$a$ of the outboard shoulder main groove 3.

The second outboard middle lateral grooves 24 extend from the respective short segments 4$b$ of the outboard crown main groove 4 to the respective second projecting parts 3$b$ of the outboard shoulder main groove 3.

It is preferable that the groove width of each of the first outboard middle lateral grooves 23 is gradually increased toward the axially outside in order that, during cornering on snowy roads, snow is compacted into the groove and the compacted snow block generates a large shearing force.

Figure 4:
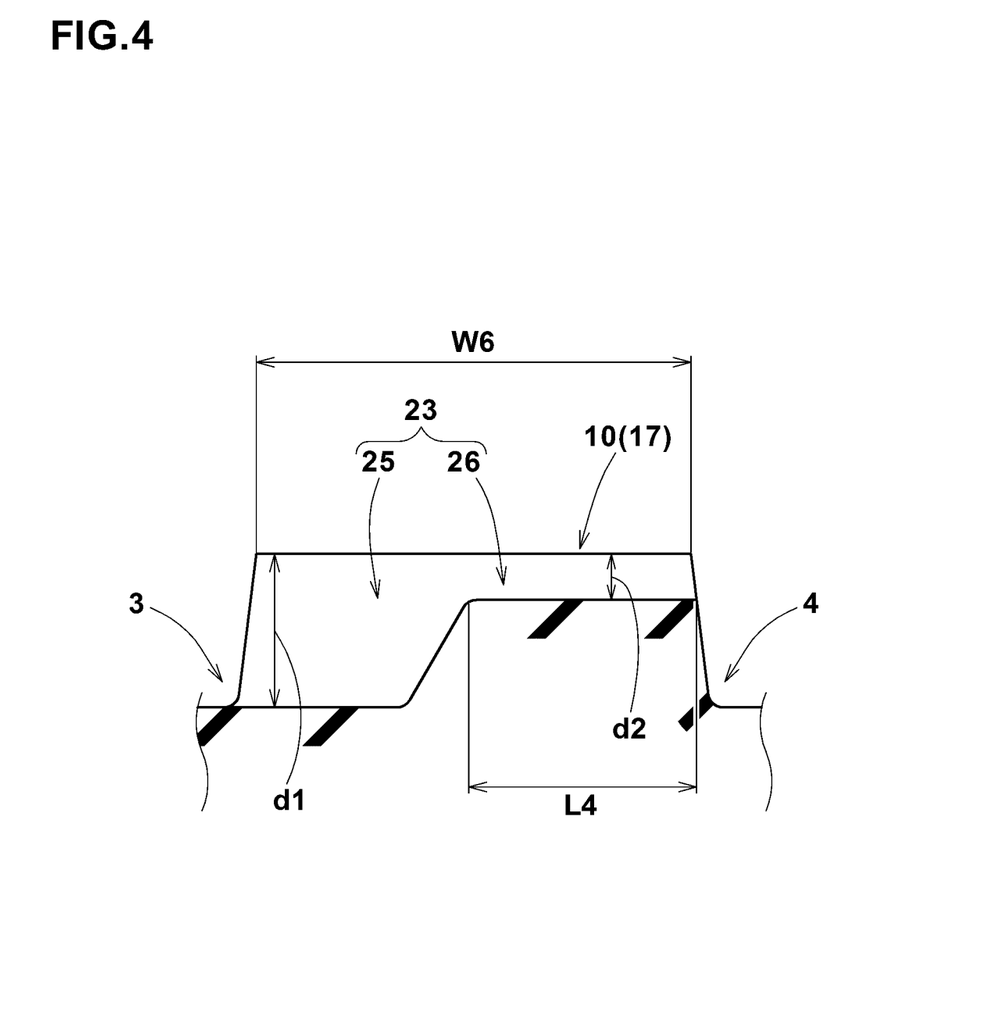
FIG. 4 is a cross sectional view taken along line A-A of FIG. 2.

It is preferable that the first outboard middle lateral groove 23 comprises an axially outer deep portion 25 connected to the outboard shoulder main groove 3, and an axially inner shallow portion 26 connected to the outboard crown main groove 4 as shown in FIG. 4.

The groove depth d2 of the shallow portion 26 is less than (for example, in a range from 0.15 to 0.30 times) the groove depth d1 of the deep portion 25.

It is preferable that the axial length L4 of the shallow portion 26 is set in a range from 0.40 to 0.60 times the axial width W6 of the outboard middle blocks 17.

Such first outboard middle lateral grooves 23 increase the rigidity of an axially inner part of the outboard middle land region 10 to improve the steering stability on dry roads.

It is preferable that each of the second outboard middle lateral grooves 24 is bent in a stepped manner as shown in FIG. 2. Specifically, the second outboard middle lateral groove 24 is composed of a first part 27 connected to the outboard crown main groove 4, and a second part 28 connected to the outboard shoulder main groove 3 and shifted from the first part 27 in the tire circumferential direction.

During running on icy roads, such second outboard middle lateral grooves 24 can generate a frictional force in the tire axial direction.

In this embodiment, the outboard shoulder land region 11 between the outboard shoulder main groove 3 and the outboard tread edge To is provided with an outboard shoulder narrow groove 30 extending continuously in the tire circumferential direction, and thereby, the outboard shoulder land region 11 is subdivided into a first outboard shoulder land region 31 between the outboard shoulder main groove 3 and the outboard shoulder narrow groove 30, and a second outboard shoulder land region 32 between the outboard shoulder narrow groove 30 and the outboard tread edge To.

The outboard shoulder narrow groove 30 in this example extends zigzag. It is preferable that the outboard shoulder narrow groove 30 has a groove width W5 of from 0.15 to 0.35 times the groove width W1 of the outboard shoulder main groove 3.

The first outboard shoulder land region 31 comprises a plurality of first outboard shoulder blocks 34 circumferentially divided by a plurality of first outboard shoulder lateral grooves 33 extending in the tire axial direction.

The first outboard shoulder lateral grooves 33 extend from the outboard shoulder main groove 3 to the outboard shoulder narrow groove 30.

It is preferable that the first outboard shoulder lateral grooves 33 in this embodiment are connected to the respective first projecting parts 3*a* of the outboard shoulder main groove 3 so as to smoothly continue to the respective first outboard middle lateral grooves 23.

During running on snowy roads, such first outboard shoulder lateral grooves 33 can form large snow blocks in cooperation with the first outboard middle lateral grooves 2.

Preferably, the groove width of the first outboard shoulder lateral groove 33 is gradually increased toward the axially outside. More preferably, the groove width is increased in a stepped manner in order to exert excellent on-snow performance.

It is preferable that the first outboard shoulder blocks 34 each have a circumferentially long shape in which its axial dimension is less than its circumferential dimension.

In this embodiment, the first outboard shoulder blocks 34 having the circumferentially long shape are arranged adjacently to the outboard middle blocks 17 having axially long shapes in order to utilize their deformations occurring in different directions when contacting with the ground for preventing the adjacent grooves from being clogged with the compressed snow.

The first outboard shoulder blocks 34 are each provided with a plurality of first outboard shoulder sipes 36 extending zigzag in the tire axial direction.

The axially inner side surface of each of the first outboard shoulder blocks 34 is provided with a concave portion 35. It is preferable that the concave portions 35 are disposed axially outside the axially outer open ends of the respective second outboard middle lateral grooves 24.

During running on snowy roads, such concave portions 35 help to form large snow blocks in cooperation with the second outboard middle lateral grooves 24.

It is preferable that at least one of axially inner ends 36*i* of the first outboard shoulder sipes 36 is connected with or opened to the outboard shoulder main groove 3.

Of the first outboard shoulder sipes 36 in this embodiment, the first outboard shoulder sipes 36*a* adjacent to the concave portions 35 have their axially inner ends terminated within the block, and the other first outboard shoulder sipes 36*b* have their axially inner ends connected with or opened to the outboard shoulder main groove 3.

Thereby, the first outboard shoulder blocks 34 can be deformed appropriately so that the edges of the sipes effectively contact with the ground.

The axially outer ends 36*o* of all the first outboard shoulder sipes 36 are terminated within the first outboard shoulder blocks 34 in order to maintain the rigidity of the first outboard shoulder blocks 34 in their axially outer parts not to deteriorate the steering stability on dry roads.

The second outboard shoulder land region 32 is circumferentially divided into a plurality of second outboard shoulder blocks 38 by a plurality of second outboard shoulder lateral grooves 37 extending from the outboard shoulder narrow groove 30 to the outboard tread edge To.

It is preferable that the second outboard shoulder lateral grooves 37 are smoothly continued to the respective first outboard shoulder lateral grooves 33. In this embodiment, one of the second outboard shoulder lateral grooves 37, one of the first outboard shoulder lateral grooves 33 and one of the first outboard middle lateral grooves 23 are smoothly continued as if they are a smoothly extending single lateral groove. Such lateral grooves' arrangement makes it possible to form a large snow block during running on snowy roads, and thereby the on-snow performance can be improved.

It is preferable that the groove widths are increased as in this embodiment from the axially inner end of the first outboard middle lateral groove 23 to the axially outer end of the second outboard shoulder lateral groove 37 through the first outboard shoulder lateral groove 33. Thereby, during cornering on snowy roads, the snow in the lateral grooves can be tightly compacted along the grooves, and it becomes possible to obtain excellent on-snow performance.

The second outboard shoulder blocks 38 are each provided with a plurality of second outboard shoulder sipes 40 extending zigzag in the tire axial direction.

It is preferable that the axially outer end 40*o* of each of the second outboard shoulder sipes 40 is terminated within the second outboard shoulder block 38 concerned in order that the rigidity of the second outboard shoulder block 38 is maintained in its axially outer part to maintain the steering stability on dry roads.

It is preferable that the axially inner end 40*i* of each of the second outboard shoulder sipes 40 in this embodiment is connected with or opened to the outboard shoulder narrow groove 30 in order that the rigidity of the second outboard shoulder blocks 38 are mitigated their axially inner parts to improve the wandering performance of the tire.

Figure 5:
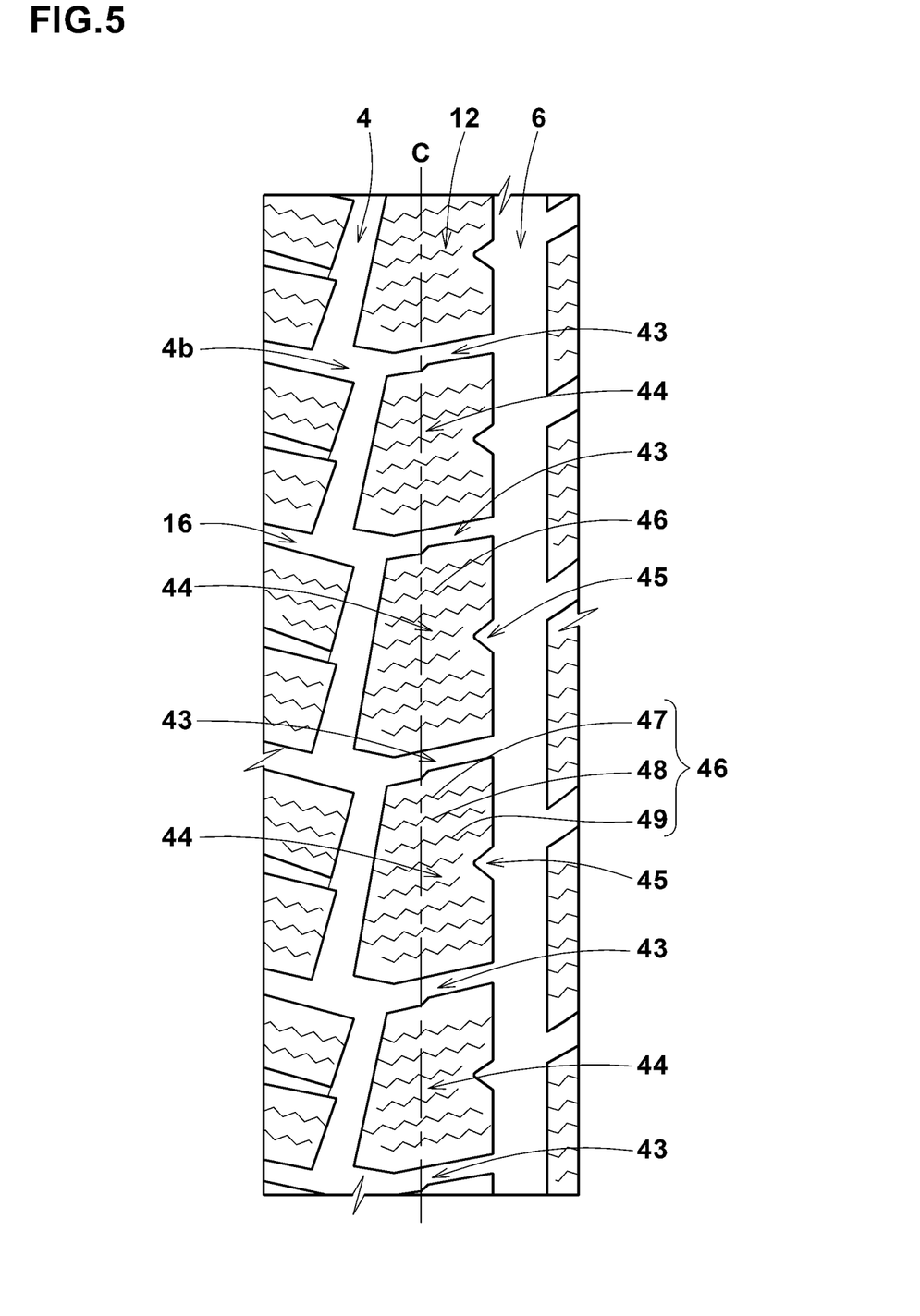
FIG. 5 is a developed partial plan view of the tire in FIG. 1 showing the crown land region.

The above-mentioned crown land region 12 between the outboard crown main groove 4 and the inboard crown main groove 6 is preferably divided into a plurality of crown blocks 44 by a plurality of crown lateral grooves 43 extending in the tire axial direction from the outboard crown main groove 4 to the inboard crown main groove 6 as shown in FIG. 5.

It is preferable that the crown lateral grooves 43 in this embodiment are connected with the respective short segments 4*b* of the outboard crown main groove 4.

It is preferable that the crown lateral grooves 43 are inclined oppositely to the outboard middle lateral grooves 16.

It is preferable that the groove widths of the crown lateral grooves 43 are gradually increased from the inboard crown main groove 6 towards the outboard crown main groove 4.

Each of the crown blocks 44 has a circumferentially long shape in which its axial dimension is less than its circumferential dimension in order to provide a rigidity relatively higher in the tire circumferential direction for the block to improve the traction performance on dry roads.

The crown blocks 44 are each provided in its inboard side surface with a concave portion 45.

The crown blocks 44 are each provided with a plurality of crown sipes 46 extending zigzag in the tire axial direction. The crown sipes 46 include a first crown sipe 47 extending across the entire width of the crown block, a second crown sipe 48 extending from the outboard crown main groove 4 and terminated within the crown block, and a third crown sipe 49 extending from the inboard crown main groove 6 and terminated within the crown block. Thereby, during running on icy roads, the crown block 44 can be appropriately deformed so that the edges of the sipes effectively contact with the ground.

Figure 6:
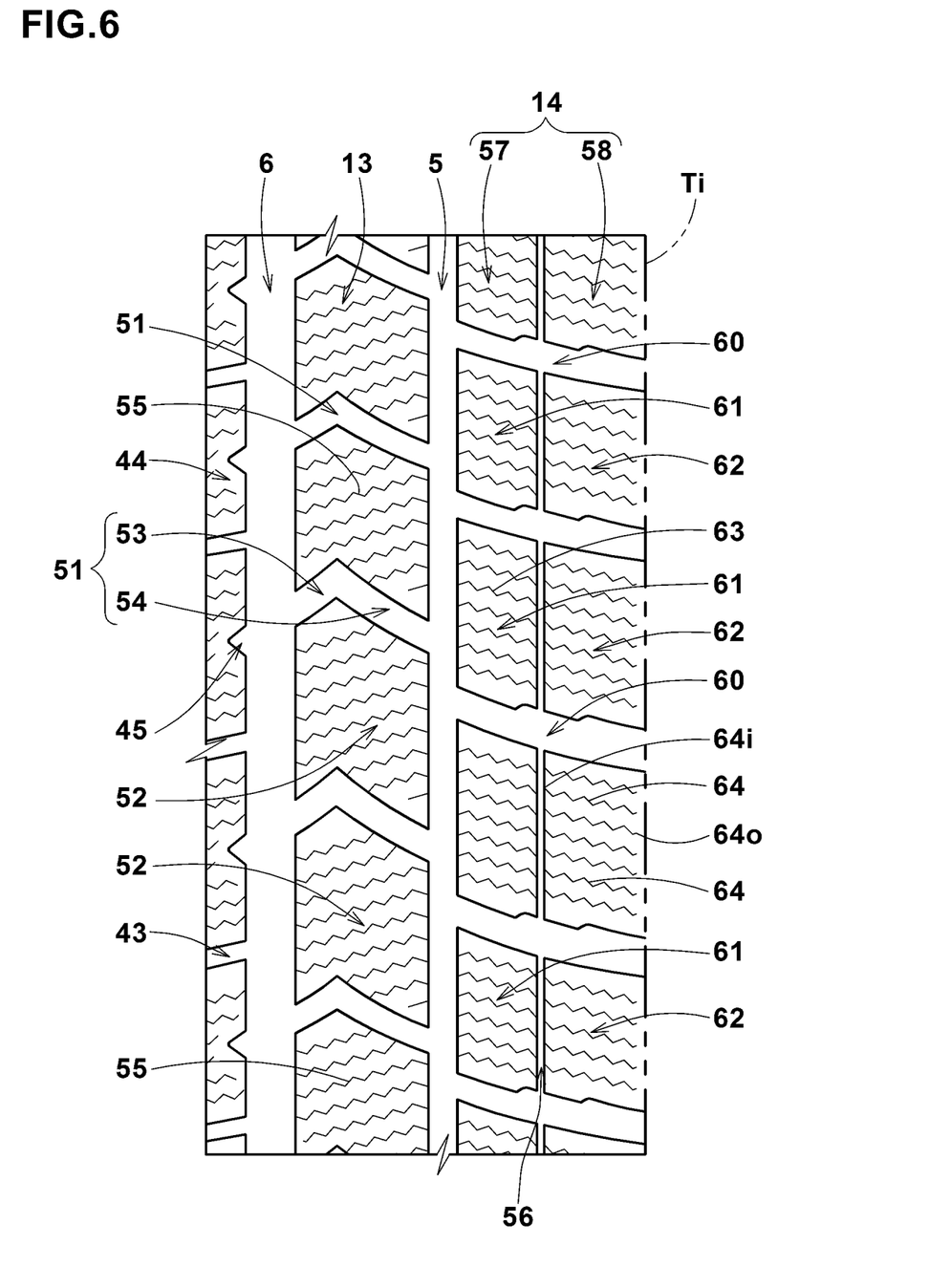
FIG. 6 is a developed partial plan view of the tire in FIG. 1 showing the inboard middle land region and the inboard shoulder land region.

The above-mentioned inboard middle land region 13 between the inboard crown main groove 6 and the inboard shoulder main groove 5 is preferably divided into a plurality of inboard middle blocks 52 by a plurality of inboard middle lateral grooves 51 extending in the tire axial direction from the inboard crown main groove 6 to the inboard shoulder main groove 5 as shown in FIG. 6.

It is preferable that each of the inboard middle lateral grooves 51 comprises a first part 53 inclined with respect to the tire axial direction, and a second part 54 inclined oppositely to the first part 53. During running on icy roads, such inboard middle lateral groove 51 can provide a frictional force in the tire axial direction by its edges.

In this embodiment, the concave portion 45 of each of the crown blocks 44 is located in the front of one of the first parts 53 in a direction of the first part 53 extending from its axially outer end to its axially inner end. Thereby, during running on snowy roads, a large snow block can be formed in the concave portion 45, the inboard middle lateral groove 51 and the inboard crown main groove 6.

It is preferable that the inboard middle blocks 52 are each provided with a plurality of inboard middle sipes 55 extending zigzag in the tire axial direction.
It is preferable that at least 50% in the number of the inboard middle sipes 55 of each of the inboard middle blocks 52 in this embodiment extend across the entire width of the inboard middle block 52 in order to improve the traction performance during running on icy roads.

The above-mentioned inboard shoulder land region 14 between the inboard shoulder main groove 5 and the inboard tread edge Ti this embodiment is provided with an inboard shoulder narrow groove 56 extending straight and continuously in the tire circumferential direction, and divided into a first inboard shoulder land region 57 between the inboard shoulder narrow groove 56 and the inboard shoulder main groove 5, and a second inboard shoulder land region 58 between the inboard shoulder narrow groove 56 and the inboard tread edge Ti.

The first inboard shoulder land region 57 is circumferentially divided into first inboard shoulder blocks 61 by a plurality of inboard shoulder lateral grooves 60 extending from the inboard shoulder main groove 5 to the inboard tread edge Ti. The second inboard shoulder land region 58 is circumferentially divided by the inboard shoulder lateral grooves 60 into a plurality of second inboard shoulder blocks 62.

It is preferable that the inboard shoulder lateral grooves 60 are inclined with respect to the tire axial direction to the same direction as the second parts 54 of the inboard middle lateral grooves 51.
It is preferable that the groove width of each of the inboard shoulder lateral grooves 60 is gradually increased towards the inboard tread edge Ti in a stepped manner.

The first inboard shoulder blocks 61 each have a circumferentially long shape in which its circumferential dimension is larger than its axial dimension.
The second inboard shoulder blocks 62 each have a circumferentially long shape in which its circumferential dimension is larger than its axial dimension.

It is preferable that each of the first inboard shoulder blocks 61 is provided with a plurality of first inboard shoulder sipes 63 extending zigzag in the tire axial direction. In this embodiment, it is preferable that each of the first inboard shoulder sipes 63 extends across the entire width of the block in order to effectively increase the traction during running on icy roads.

It is preferable that each of the second inboard shoulder blocks 62 is provided with a plurality of second inboard shoulder sipes 64 extending zigzag in the tire axial direction. In this embodiment, each of the second inboard shoulder sipes 64 has its axially inner end 64i connected with the inboard shoulder narrow groove 56 and its axially outer end 64o terminated within the block in order to maintain the rigidity of the second inboard shoulder block 62 to improve the steering stability on dry roads.

While detailed description has been made of an especially preferable embodiment of the present invention, the present invention can be embodied in various forms without being limited to the illustrated embodiment.

Comparison Tests

Figure 7:
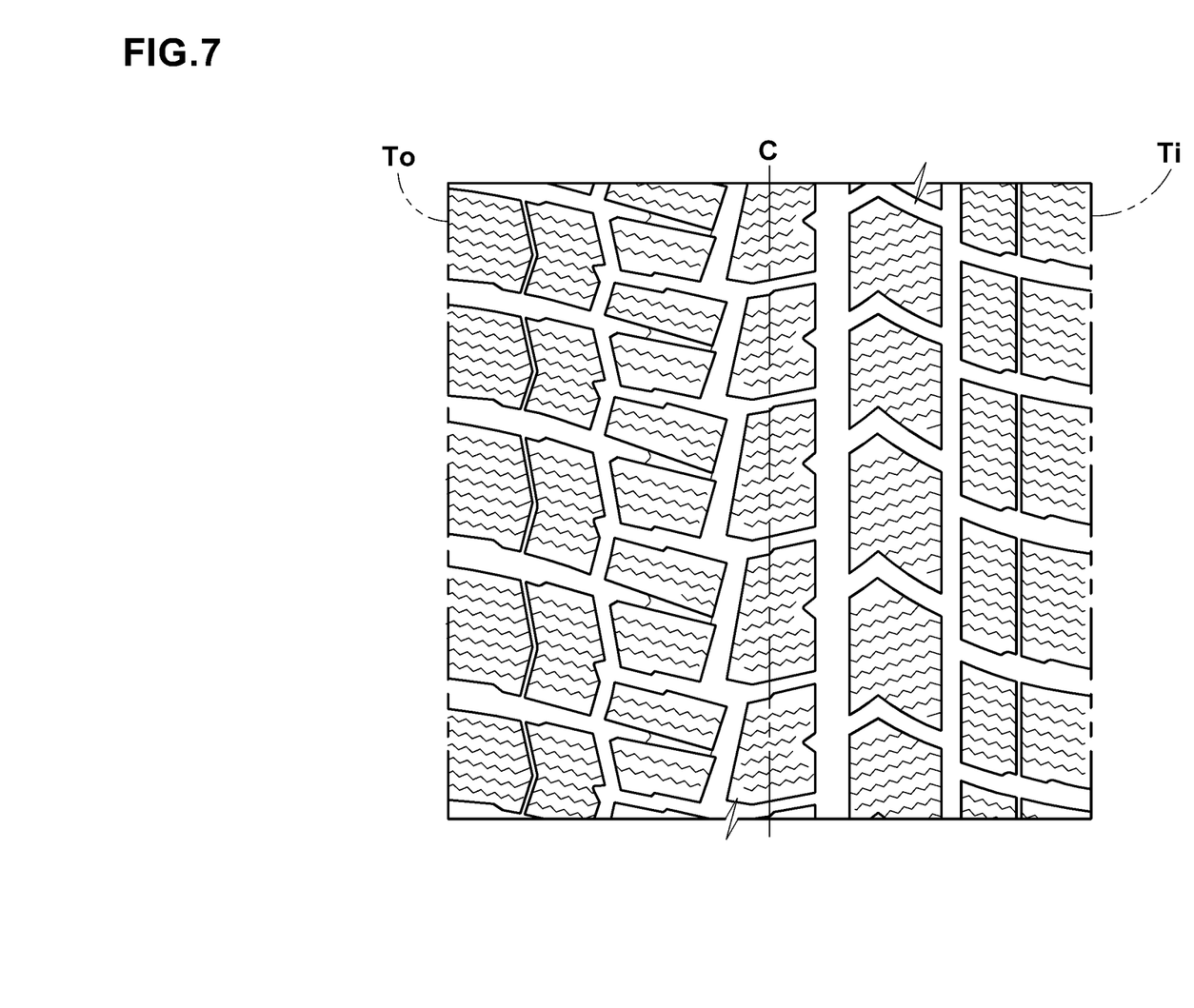
FIG. 7 is a developed partial plan view of a tire as a comparative example showing the tread pattern.

Based on the tread pattern shown in FIG. 1, pneumatic tires of size 205/55R16 (rim size 16×7.0) for passenger cars were experimentally manufactured as test tires including working examples Ex. 1-Ex. 9 and a comparative example Ref.
The comparative example Ref. had a tread pattern shown in FIG. 7 which was similar to FIG. 1, but the outboard middle sipes, the first outboard shoulder sipes and the second outboard shoulder sipes were extended completely across the respective blocks.

Except for specifications shown in Table 1, the test tires had the same structure. The tread width TW was 180 mm, and all of the main grooves had the same groove depth of 9.5 mm.

Using a test car (2000 cc rear-wheel-drive car provided on all wheels with test tires inflated to 210 kPa), the test tires were tested for on-ice performance and steering stability on dry roads as follows.

<On-Ice Performance>
Driving the test car on an icy road, the test driver evaluated the on-ice performance based on the traction performance, braking performance and cornering performance.
The results are indicated in Table 1 by an index based on Comparative example being 100 wherein the larger the numeric value, the better the on-ice performance.

<Steering Stability on Dry Roads>
Driving the test car on a dry road, the test driver evaluated the steering stability.
The results are indicated in Table 1 by an index based on comparative example being 100 wherein the larger the numeric value, the better the steering stability on dry roads.

TABLE 1

| Tire | Ref. | Ex. 1 | Ex. 2 | Ex. 3 | Ex. 4 | Ex. 5 | Ex. 6 | Ex. 7 | Ex. 8 | Ex. 9 |
| --- | --- | --- | --- | --- | --- | --- | --- | --- | --- | --- |
| tread pattern (No. of FIG.) | 7 | 1 | 1 | 1 | 1 | 1 | 1 | 1 | 1 | 1 |
| distance L1(mm) | 0 | 1.5 | 0.5 | 1.0 | 2.5 | 3.0 | 1.5 | 1.5 | 1.5 | 1.5 |
| distance L2(mm) | 2.4 | 2.4 | 2.4 | 2.4 | 2.4 | 2.4 | 1.0 | 2.0 | 3.0 | 4.0 |
| on-ice performance | 100 | 103 | 105 | 103 | 102 | 101 | 104 | 103 | 102 | 101 |
| steering stability on dry roads | 100 | 108 | 104 | 107 | 108 | 108 | 105 | 106 | 108 | 109 |

From the test results, it was confirmed that the tires according to the present invention were improved in the on-ice performance and the steering stability on dry roads in a good balance.

REFERENCE SIGNS LIST 2 tread portion
3 outboard shoulder main groove
4 outboard crown main groove
10 outboard middle land region
16 outboard middle lateral groove
17 outboard middle blocks
20 outboard middle sipe
To outboard tread edge
Ti inboard tread edge

The invention claimed is:

1. A tire comprising:
a tread portion having an outboard tread edge to be positioned away from a center of a vehicle body and an inboard tread edge to be positioned close to the center of the vehicle body,
the tread portion being provided with
an outboard shoulder main groove which is a zigzag groove extending continuously in the tire circumferential direction comprising long segments and short segments which alternate in the tire circumferential direction, with the long segments being inclined in one circumferential direction and the short segments being inclined in a circumferential direction opposite to that of the long segments, and
an outboard crown main groove extending continuously in the tire circumferential direction and disposed between the outboard shoulder main groove and a tire equator so as to define an outboard middle land region therebetween,
the outboard middle land region comprising a plurality of outboard middle blocks circumferentially divided by a plurality of outboard middle lateral grooves, and
each of the outboard middle blocks being provided with a plurality of outboard middle sipes extending zigzag in the tire axial direction,
wherein
said plurality of outboard middle sipes each have an axially outer end terminated within the outboard middle block,
said plurality of outboard middle sipes include at least one outboard middle sipe having an axially inner end connected with the outboard crown main groove, and
said plurality of outboard middle blocks are not provided with any sipes that are in communication with the outboard shoulder main groove.

2. The tire according to claim 1, wherein said a plurality of outboard middle sipes include a first outboard middle sipe connected with the outboard crown main groove, and a second outboard middle sipe whose inner end is terminated within the outboard middle block.

3. The tire according to claim 2, wherein each of the outboard middle blocks comprises a part in which the first outboard middle sipe or sipes and the second outboard middle sipe or sipes are disposed alternately in the tire circumferential direction.

4. The tire according to claim 1, wherein shortest distances between the adjacent outboard middle sipes are in a range from 2.0 to 3.0 mm.

5. The tire according to claim 1, wherein the shortest distance from said axially outer end of the outboard middle sipe to the adjacent groove edge of the outboard shoulder main groove is in a range from 1.0 to 3.0 mm.

6. The tire according to claim 1, wherein
the tread portion is provided with an outboard shoulder narrow groove extending continuously in the tire circumferential direction and disposed between the outboard shoulder main groove and the outboard tread edge so as to define
a first outboard shoulder land region between the outboard shoulder narrow groove and the outboard shoulder main groove, and
a second outboard shoulder land region between the outboard shoulder narrow groove and the outboard tread edge.

7. The tire according to claim 6, wherein
the first outboard shoulder land region comprises a plurality of first outboard shoulder blocks circumferentially divided by a plurality of first outboard shoulder lateral grooves,
each of the first outboard shoulder blocks is provided with a plurality of first outboard shoulder sipes extending zigzag in the tire axial direction, and
each of the first outboard shoulder sipes has an axially outer end terminated within the first outboard shoulder block.

8. The tire according to claim 6, wherein
the second outboard shoulder land region comprises a plurality of second outboard shoulder blocks circumferentially divided by a plurality of second outboard shoulder lateral grooves,
each of the second outboard shoulder blocks is provided with a plurality of second outboard shoulder sipes extending zigzag in the tire axial direction, and
each of the second outboard shoulder sipes has an axially outer end terminated within the second outboard shoulder block.

9. A tire comprising:
a tread portion having an outboard tread edge to be positioned away from a center of a vehicle body and an inboard tread edge to be positioned close to the center of the vehicle body, the tread portion provided with
an outboard shoulder main groove extending continuously in the tire circumferential direction,
an outboard crown main groove extending continuously in the tire circumferential direction and disposed between the outboard shoulder main groove and a tire equator so as to define an outboard middle land region between outboard shoulder main groove and the outboard crown main groove, and
an outboard shoulder narrow groove extending continuously in the tire circumferential direction and disposed between the outboard shoulder main groove and the outboard tread edge so as to define a first outboard shoulder land region between the outboard shoulder narrow groove and the outboard shoulder main groove, and a second outboard shoulder land region between the outboard shoulder narrow groove and the outboard tread edge,
the outboard middle land region comprising a plurality of outboard middle blocks circumferentially divided by a plurality of outboard middle lateral grooves, and
each of the outboard middle blocks provided with a plurality of outboard middle sipes extending zigzag in the tire axial direction, wherein
said plurality of outboard middle sipes each have an axially outer end terminated within the outboard middle block,
said plurality of outboard middle sipes include at least one outboard middle sipe having an axially inner end connected with the outboard crown main groove,
the first outboard shoulder land region comprises a plurality of first outboard shoulder blocks circumferentially divided by a plurality of first outboard shoulder lateral grooves,
each of the first outboard shoulder blocks is provided with a plurality of first outboard shoulder sipes extending zigzag in the tire axial direction, and
each of the first outboard shoulder sipes has an axially outer end terminated within the first outboard shoulder block so as not to communicate with the outboard shoulder narrow groove.

10. The tire according to claim 2, wherein a shortest distance (L1) from the axially outer end of each outboard middle sipe to an axially inner groove edge of the outboard shoulder main groove 3 is not less than 1.0 mm, but not more than 3.0 mm.

11. The tire according to claim 1, wherein the outboard middle lateral grooves comprise first outboard middle lateral grooves which are connected to the respective long segments of the outboard crown main groove in such a manner that the first outboard middle lateral grooves are not in contact with the short segments.

12. The tire according to claim 11, wherein a groove width of each of the first outboard middle lateral grooves is continuously increased from its axially inner end to its axially outer end.

13. The tire according to claim 11, wherein the outboard middle lateral grooves comprise second outboard middle lateral grooves which are bent in a stepped manner.

14. A tire comprising:
a tread portion having an outboard tread edge to be positioned away from a center of a vehicle body and an inboard tread edge to be positioned close to the center of the vehicle body,
the tread portion being provided with
an outboard shoulder main groove extending continuously in the tire circumferential direction, and
an outboard crown main groove extending continuously in the tire circumferential direction and disposed between the outboard shoulder main groove and a tire equator so as to define an outboard middle land region therebetween,
the outboard middle land region comprising a plurality of outboard middle blocks circumferentially divided by a plurality of outboard middle lateral grooves, and
each of the outboard middle blocks being provided with a plurality of outboard middle sipes extending zigzag in the tire axial direction,
wherein
said plurality of outboard middle sipes each have an axially outer end terminated within the outboard middle block,
said plurality of outboard middle sipes include at least one outboard middle sipe having an axially inner end connected with the outboard crown main groove,
said plurality of outboard middle blocks are not provided with any sipes that are in communication with the outboard shoulder main groove, and
a groove width (W1) of the outboard shoulder main groove is less than a groove width (W2) of the outboard crown main groove.

15. The tire according to claim 1, wherein the outboard middle blocks each have an axially long top shape where an axial dimension thereof is more than a circumferential dimension thereof.

16. The tire according to claim 6, wherein the outboard shoulder narrow groove extends in a zigzag manner.

17. The tire according to claim 16, wherein the outboard shoulder narrow groove has a groove width (W5) of from 0.15 to 0.35 times a groove width (W1) of the outboard shoulder main groove.

18. The tire according to claim 7, wherein said a plurality of first outboard shoulder blocks is not provided with any sipes that are in communication with the outboard shoulder narrow groove.

19. The tire according to claim 8, wherein the second outboard shoulder lateral grooves are smoothly continued to the respective first outboard shoulder lateral grooves through the outboard shoulder narrow groove such that a pair of groove edges of the second outboard shoulder lateral grooves are located on extension lines of a pair of groove edges of the first outboard shoulder lateral grooves.

* * * * *